US012688658B2

(12) United States Patent
Wu et al.

(10) Patent No.: US 12,688,658 B2
(45) Date of Patent: Jul. 21, 2026

(54) VIRTUAL REALITY-BASED CONTROL METHOD, APPARATUS, TERMINAL, AND STORAGE MEDIUM

(71) Applicant: Beijing Zitiao Network Technology Co., Ltd., Beijing (CN)

(72) Inventors: Peipei Wu, Beijing (CN); Liyue Ji, Beijing (CN); Xiang He, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 393 days.

(21) Appl. No.: 18/446,143

(22) Filed: Aug. 8, 2023

(65) Prior Publication Data

US 2024/0046588 A1 Feb. 8, 2024

(30) Foreign Application Priority Data

Aug. 8, 2022 (CN) .......................... 202210946046.7

(51) Int. Cl.
*G06T 19/00* (2011.01)
*G06T 17/30* (2006.01)

(52) U.S. Cl.
CPC ............ *G06T 19/006* (2013.01); *G06T 17/30* (2013.01)

(58) Field of Classification Search
CPC ....... G06T 19/006; G06T 17/30; G06F 3/011; G06F 3/04815; G06F 3/0484
See application file for complete search history.

(56) References Cited

U.S. PATENT DOCUMENTS

| | | | |
|---|---|---|---|
| 2021/0096638 A1* | 4/2021 | O'Hern | G06F 3/04815 |
| 2021/0256261 A1* | 8/2021 | Wang | G06F 3/011 |
| 2022/0019450 A1* | 1/2022 | VanBlon | G06F 3/167 |
| 2022/0124140 A1* | 4/2022 | Okina | G06V 40/20 |

\* cited by examiner

*Primary Examiner* — Chong Wu
(74) *Attorney, Agent, or Firm* — Astute IP Law Group

(57) ABSTRACT

The present disclosure provides a virtual reality-based control method, apparatus, terminal, and storage medium, wherein the virtual reality-based control method includes: displaying a virtual entity and a suspended bubble associated with the virtual entity in a virtual reality space, the suspended bubble being configured to indicate a function of the virtual entity; and controlling, in response to a movement event of the virtual entity in the virtual reality space, the suspended bubble to follow the virtual entity to move.

12 Claims, 3 Drawing Sheets

Displaying a virtual entity and a suspended bubble associated with the virtual entity in a virtual reality space, the suspended bubble being configured to indicate a function of the virtual entity — S11

Controlling, in response to a movement event of the virtual entity in the virtual reality space, the suspended bubble to follow the virtual entity to move — S12

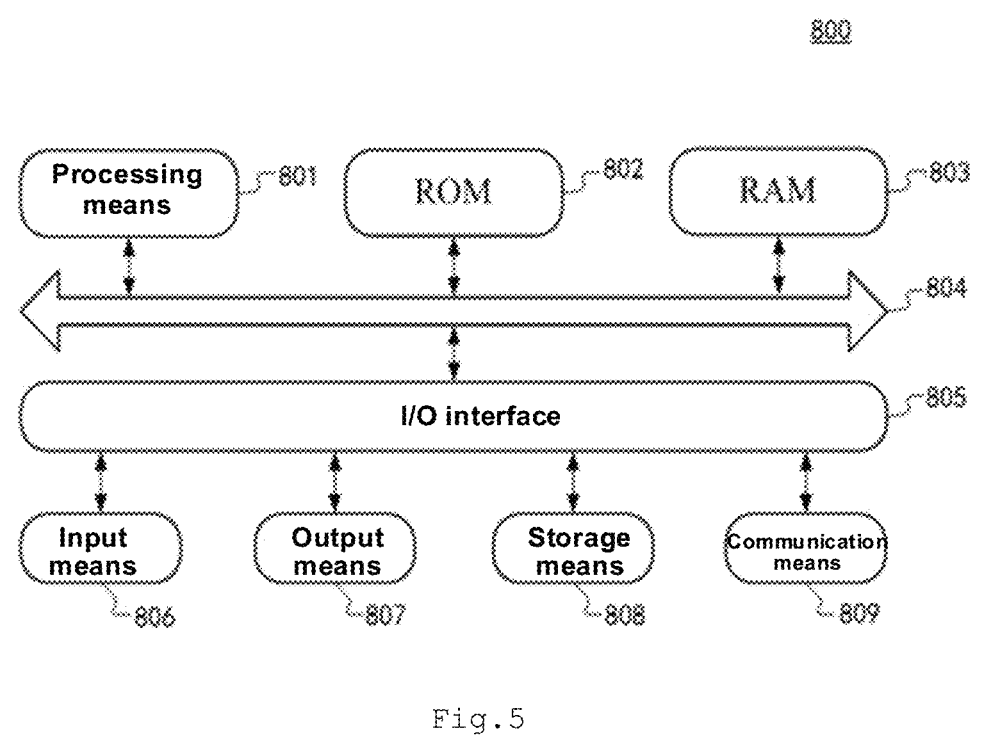

800

| Processing means | ~801 | ROM | ~802 | RAM | ~803 |

~804

I/O interface ~805

| Input means | Output means | Storage means | Communication means |
| 806 | 807 | 808 | 809 |

Fig.5

VIRTUAL REALITY-BASED CONTROL METHOD, APPARATUS, TERMINAL, AND STORAGE MEDIUM

CROSS-REFERENCE TO RELATED APPLICATIONS

The present application is based on and claims priority to Chinese Patent Application No. 202210946046.7 filed on Aug. 8, 2022, the disclosure of which is incorporated by reference herein in its entirety.

TECHNICAL FIELD

The present disclosure relates to the field of computer technologies, and in particular, to a virtual reality-based control method, apparatus, terminal, and storage medium.

BACKGROUND

Virtual Reality (VR for short), also known as virtual environment, is a technology to generate, by using a computer, feelings in senses of sight, hearing and touch that can be directly exerted to participants, and to allow them to interact. Users can watch images and interact in a virtual reality space through virtual reality devices.

SUMMARY

The present disclosure provides a virtual reality-based control method, apparatus, terminal, and storage medium. The present disclosure employs the following technical solutions.

In some embodiments, the present disclosure provides a virtual reality-based control method, comprising:

displaying a virtual entity and a suspended bubble associated with the virtual entity in a virtual reality space, the suspended bubble being configured to indicate a function of the virtual entity; and controlling, in response to a movement event of the virtual entity in the virtual reality space, the suspended bubble to follow the virtual entity to move.

In some embodiments, the present disclosure provides a virtual reality-based control apparatus, comprising:

a display configured to display a virtual entity and a suspended bubble associated with the virtual entity in a virtual reality space, the suspended bubble being configured to indicate a function of the virtual entity; and a controller configured to control, in response to a movement event of the virtual entity in the virtual reality space, the suspended bubble to follow the virtual entity to move.

In some embodiments, the present disclosure provides a terminal, comprising: at least one memory and at least one processor, wherein the memory is configured to store program code, and the processor is configured to call the program code stored in the memory to perform the above method.

In some embodiments, the present disclosure provides a non-transitory computer-readable storage medium for storing program code which, when run by a computer, causes the computer to perform the method according to any of the above.

BRIEF DESCRIPTION OF THE DRAWINGS

The above and other features, advantages, and aspects of embodiments of the present disclosure will become more apparent in conjunction with the accompanying drawings and with reference to the following DETAILED DESCRIPTION. Throughout the drawings, identical or similar reference numbers refer to identical or similar elements. It should be understood that the drawings are schematic and that components and elements are not necessarily drawn to scale.

FIG. 5 is a schematic structural diagram of an electronic device according to an embodiment of the present disclosure.

DETAILED DESCRIPTION

Figures 1, 2:
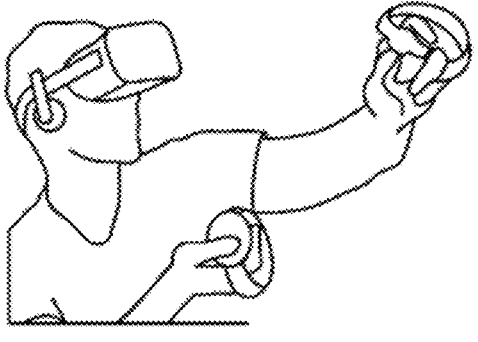
FIG. 1 is a schematic diagram of using a virtual reality device according to an embodiment of the present disclosure.
FIG. 2 is a flow diagram of a virtual reality-based control method according to an embodiment of the present disclosure.

Embodiments of the present disclosure will be described in more detail below with reference to the accompanying drawings. While certain embodiments of the present disclosure are shown in the drawings, it should be understood that the present disclosure may be implemented in various forms and should not be construed as limited to the embodiments set forth herein, but rather, these embodiments are provided for a more complete and thorough understanding of the present disclosure. It should be understood that the drawings and the embodiments of the present disclosure are for exemplary purposes only and are not intended to limit the protection scope of the present disclosure.

It should be understood that various steps recited in method embodiments of the present disclosure may be performed in a different order than the illustrated one, and/or performed in parallel. Moreover, the method embodiments may comprise additional steps and/or omit performing the illustrated steps. The scope of the present disclosure is not limited in this respect.

The term "comprising" and variations thereof used herein is intended to be open-ended, i.e., "comprising but not limited to". The term "based on" is "at least partially based on". The term "one embodiment" means "at least one embodiment"; the term "another embodiment" means "at least one other embodiment"; the term "some embodiments" means "at least some embodiments". Relevant definitions for other terms will be given in the following description.

It should be noted that the concepts "first", "second", and the like mentioned in the present disclosure are only used for distinguishing different devices, modules or units, and are not used for limiting the order or interdependence of functions performed by the devices, modules or units.

It should be noted that modification of "one" mentioned in this disclosure are intended to be illustrative rather than restrictive, and that those skilled in the art should appreciate that they should be understood as "one or more" unless otherwise explicitly stated in the context.

Names of messages or information exchanged between a plurality of devices in the embodiments of the present disclosure are for illustrative purposes only, and are not intended to limit the scope of the messages or information.

According to the virtual reality-based display method provided in the present disclosure, for the virtual entity displayed in the virtual reality space, by displaying the function of the virtual entity by means of the suspended bubble, a user can intuitively understand a role of the virtual entity, thereby making it possible to reduce study cost of the user and improve use experience of the user, and when the virtual entity moves in the virtual reality space, the suspended bubble will follow to move such that the user can always view the suspended bubble and therefore understand the function and role of the virtual entity.

The solutions provided by the embodiments of the present application will be described in detail below in conjunction with the accompanying drawings.

As shown in FIG. 1, a user may enter a virtual reality space through a smart terminal device such as head-mounted VR glasses and the like, and control his avatar in the virtual reality space, to perform social interaction, entertainment, study, remote office, and the like, with avatars controlled by other users.

The virtual reality space may be a simulation environment for a real world, or a semi-simulated, semi-fictional virtual scene, or a purely fictional virtual scene. The virtual scene may be any of a two-dimensional virtual scene, a 2.5-dimensional virtual scene, or a three-dimensional virtual scene, and the dimension of the virtual scene is not limited in the embodiments of the present application. For example, a virtual scene may include sky, land, ocean, etc., the land may include environmental elements such as desert, city and the like, and a user may control a virtual object to move in the virtual scene.

In an embodiment, in a virtual reality space, the user may implement a related interactive operation through an operation device, which may be a handle, for example, the user performs related operation control by operating keys of the handle. Of course, in another embodiment, a target object in the virtual reality device may be controlled by using a gesture or voice or multi-modal control instead of using a controller.

In some embodiments of the present disclosure, there is provided a virtual reality-based control method, the control method may be used for a virtual reality device, and the virtual reality device is a terminal for achieving a virtual reality effect, and may be generally provided in a form of glasses, head mount display (HMD), or contact lenses, for achieving visual perception and other forms of perception; of course, the form in which the virtual reality device is achieved is not limited thereto, and it can be further miniaturized or enlarged as needed.

The virtual reality device described in the embodiments of the present disclosure may include, but is not limited to, the following types:

A personal computer virtual reality (PCVR) device, which performs calculations related to virtual reality functions and data output by using a PC; an externally connected personal computer virtual reality device achieves the virtual reality effect using the data outputted by the PC.

A mobile virtual reality device which supports the arrangement of a mobile terminal (such as a smartphone) in various manners (such as a head-mounted display provided with a special card slot); by connecting the mobile virtual reality with the mobile terminal in a wired or wireless manner, the mobile terminal performs calculations related to virtual reality functions and outputs data to the mobile virtual reality device, for example, a virtual reality video is watched through an APP of the mobile terminal.

An all-in-one virtual reality device, which is provided with a processor for performing calculations related to virtual reality functions, thereby having independent virtual reality input and output functions, without the need of being connected to a PC or a mobile terminal and thus with a high degree of freedom in use.

The virtual reality device can present virtual reality images in a virtual reality space, an underlying layer of the virtual reality device always uses an operating system such as Android and IOS, but the displayed virtual reality images cannot be directly subjected to a touch operation, thus an operation event performed through the virtual reality images cannot be directly executed by a system in the underlying layer.

In some embodiments of the present disclosure, there is provided a virtual reality-based control method, as shown in FIG. 2, the method comprising S11 and S12.

S11: displaying a virtual entity and a suspended bubble associated with the virtual entity in a virtual reality space, the suspended bubble being configured to indicate a function of the virtual entity.

Figure 3:
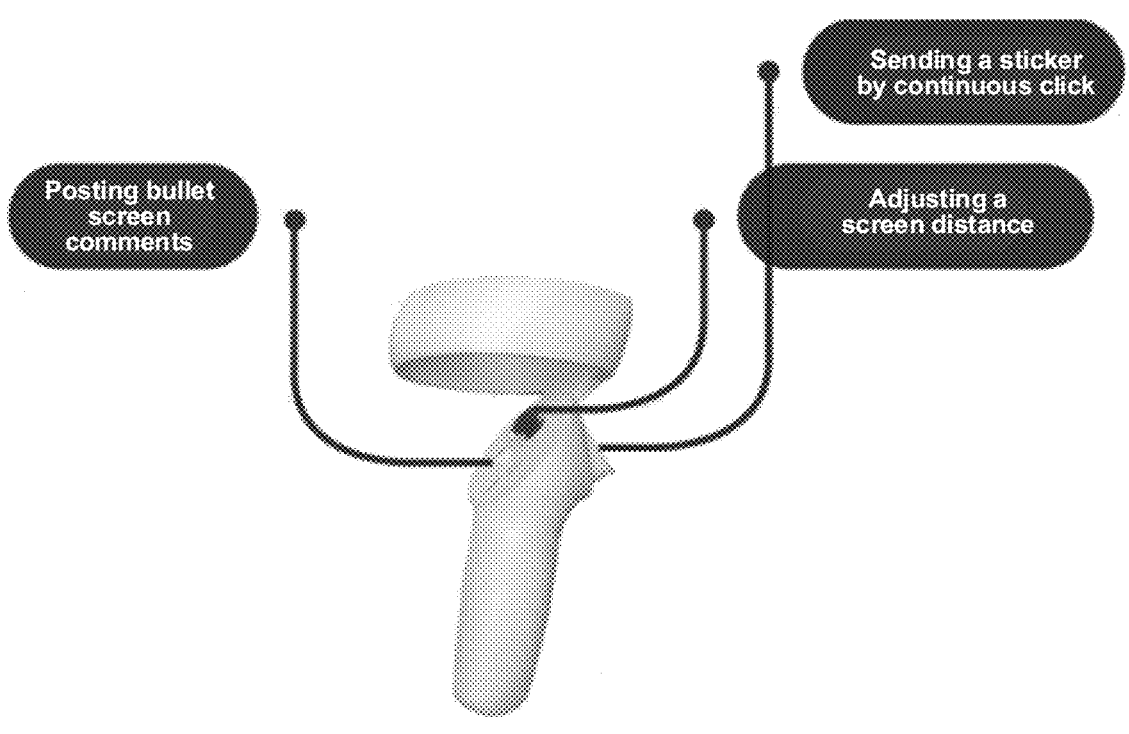
FIG. 3 is a schematic diagram of a virtual entity and a suspended bubble according to an embodiment of the present disclosure.

In some embodiments, the virtual reality space is a virtual control displayed in the virtual reality device, and the virtual entity may be an object displayed in the virtual reality space corresponding to an entity in the real world, for example, there is a handle in the real world, and the virtual entity may be a virtual handle displayed in the virtual reality space corresponding to the handle in the real world. As shown in FIG. 3, for the virtual entity, it has a suspended bubble displayed in association therewith, and the association between the suspended bubble and the virtual entity may be reflected as the suspended bubble following the virtual entity. In the suspended bubble, the function of the virtual entity can be displayed, specifically, the number of the suspended bubbles can be one or more; there are components in the virtual entity, and one suspended bubble corresponds to one component and is used for displaying a function of the corresponding component. For example, as shown in FIG. 3, the virtual entity is a virtual handle, on which there are three components for posting bullet screen comments, sending a sticker by continuous click, and adjusting a screen distance, respectively, and the function of the corresponding component is displayed inside the suspended bubble. In some embodiments, the function of the corresponding component includes not only how to use but also an effect of the use. In some embodiments, the suspended bubble may be in a translucent state so as to avoid shielding a scene in the virtual reality space.

S12: controlling, in response to a movement event of the virtual entity in the virtual reality space, the suspended bubble to follow the virtual entity to move.

In some embodiments, the virtual entity may be operated to move by the user, for example, the user may hold the virtual entity to move in the virtual reality space, and in case where the virtual entity moves, the suspended bubble will follow the virtual entity to move, wherein the following may be real-time following or delayed following.

In some embodiments of the present disclosure, for the virtual entity displayed in the virtual reality space, by displaying the function of the virtual entity by means of the suspended bubble, the user can intuitively understand a role of the virtual entity, thereby making it possible to reduce user's study cost and improve user's use experience, and when the virtual entity moves in the virtual reality space, the suspended bubble will follow to move such that the user can always view the suspended bubble and therefore understand the function and role of the virtual entity.

In some embodiments of the present disclosure, the virtual entity has one or more components thereon, the suspended bubble being associated with the component; one suspended bubble may be associated with one component and is configured to indicate a role of the associated component, for example, the virtual entity is a virtual handle, and the component may include a key on the virtual handle.

The displaying the virtual entity and the suspended bubble associated with the virtual entity in the virtual reality space comprises: displaying the virtual entity, the suspended bubble, and a leading line in the virtual reality space, the leading line having one end connected with the suspended bubble and the other end connected with a component associated with the suspended bubble on the virtual entity. Specifically, as shown in FIG. 3, it can be seen that in the virtual reality space, a leading line is shown, two ends of which are connected with a suspended bubble and a component, respectively, so that the suspended bubble may not be displayed at a position of the component, but may have a certain distance from the component, thereby avoiding the suspended bubble from shielding the component. The suspended bubble is suspended in the virtual reality space, and the leading line forms an effect similar to dragging and holding the suspended bubble. In some embodiments, the leading line is non-interactive; in other embodiments, the leading line may be interactive, for example, the leading line may be dragged by a finger so that the leading line is deformed or moved, and the suspended bubble will be dragged by the leading line to follow the leading line, thereby adding interest of interaction.

In some embodiments of the present disclosure, the displaying the virtual entity, the suspended bubble, and the leading line in the virtual reality space comprises: determining a first position A where the component associated with the suspended bubble is located; determining a second position B according to the first position A, wherein the second position B is a position where the suspended bubble is displayed, the second position B having a different horizontal position from the first position A and a greater vertical height than the first position A; and determining the leading line connecting the first position A and the second position B based on a Bezier spline connecting the first position A and the second position B, wherein each of points on the leading line other than the first position and the second position has a greater vertical height than a point at a same horizontal position on the Bezier spline.

In some embodiments, the position of the component associated with the suspended bubble is the first position A, different components have different first positions A, the second position B where the suspended bubble is displayed is determined according to the first position A, and a relative position relation between the second position B and the first position A may be predetermined, for example, the second position B may be located on a left or right side of the first position A and higher than the first position A by a predetermined height. In order to smoothly connect the first position A and the second position B, the first position A and the second position B may be connected by using the Bezier spline, but generally the Bezier spline is relatively gentle, and in order to reflect the suspension characteristic of the suspended bubble at the second position B of the leading line, in the present embodiment, a modification is made based on the Bezier spline, and the leading line may be the modified Bezier spline, each point of which has a greater slope than that of the Bezier spline, so that the leading line has a characteristic of accelerating to rise, that is, in the present embodiment, the vertical height of the leading line rises faster than that of the Bezier spline, thereby presenting the characteristic of suspending upward, which is adapted to the suspended bubble.

In some embodiments of the present disclosure, the determining the leading line connecting the first position A and the second position B based on the Bezier spline connecting the first position A and the second position B comprises: determining a third position C, the third position C having a same vertical position as the first position A and a same horizontal position as the second position B; determining a first moving point D on a first connection line AC, and determining a second moving point E on a second connection line CB, so that AD/AC<CE/CB; selecting a third moving point F on a third connection line DE, so that DF/DE=AD/AC; and by making the selected first moving point D move from the first position A to the third position C, finding out all the third moving points F, and connecting all the third moving points F to form the leading line.

Figure 4:
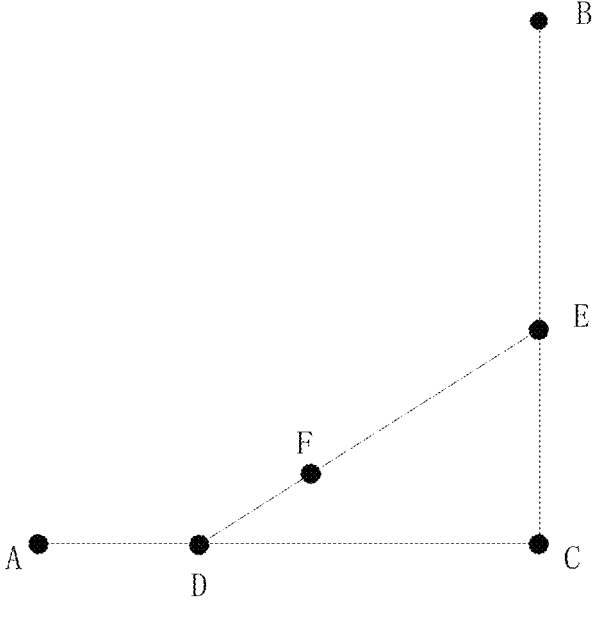
FIG. 4 is a schematic diagram of a calculation method for a leading line according to an embodiment of the present disclosure.

In some embodiments, as shown in FIG. 4, a schematic diagram of plotting a leading line is shown, where the third position C is located on the same horizontal plane as the first position A, that is, the above two have the same height in the vertical direction, and the third position C has the same horizontal position as the second position B, that is, a projection of the third position C on the horizontal plane is located at the same position as that of the second position B, the first moving point D is controlled to move from the first position A to the third position C, and the second moving point E is correspondingly controlled to move from the third position C to the second position B; a moving trajectory of the third moving point F on the line connecting the first moving point D and the second moving point E is determined, the moving trajectory of the third moving point F is a trajectory of the leading line, and the third moving point F will move from the first position A to the second position B. When the conventional Bezier spline is plotted, it is controlled so that AD/AC=CE/CB, but in the present embodiment, it is controlled so that AD/AC<CE/CB, therefore the leading line in the present embodiment may present the characteristic of rising faster compared to the conventional Bezier spline; specifically, if AD/AC is represented as variable x, CE/CB may be $x^{1/2}$; since CE/CB may be greater than AD/AC when x ranges from 0 to 1 (excluding 0 and 1), CE/CB is 0 when AD/AC is 0, and CE/CB is 1 when AD/AC is 1. Therefore, the first moving point D and the second moving point E will respectively start from the first position A and the third position C at the same time, and respectively reach the third position C and the second position B at the same time, while the third moving point F moves from the first position A to the second position B, and the moving trajectory of the third moving point F serves as the leading line. In the embodiments of the present disclosure, by modifying the algorithm of the Bezier spline, a modified Bezier spline is formed as the trajectory of the leading line, thereby achieving the effect that the suspended bubble accelerates to rise.

In some embodiments of the present disclosure, the controlling, in response to the movement event of the virtual entity in the virtual reality space, the suspended bubble to follow the virtual entity to move comprises: in response to the movement event of the virtual entity in the virtual reality space, controlling the virtual entity to move from an original position to a target position, and controlling the suspended bubble to follow the virtual entity to move with a delay.

In some embodiments of the present disclosure, a position at which the virtual entity is located before moving is the original position, a position to which it moves is the target position, the user moves the virtual entity, the virtual entity moves from the original position to the target position, when the virtual entity moves, the suspended bubble does not immediately follow to move, but rather follows to move with a delay, that is, the suspended bubble may move after the virtual entity moves to the target position, or may follow to move upon the virtual entity moves, but cannot reach the corresponding target display position until a period of time after the virtual entity moves to the target position. That is, a moving velocity of the virtual entity as a whole may be less than a moving velocity of the virtual entity, thereby reaching with a delay. By controlling the suspended bubble to follow the virtual entity to move with a delay, the suspended bubble forms an effect similar to being dragged and driven by the virtual entity, and the suspended bubble is more similar to a suspended balloon in a real space, which is more realistic and interesting. In some embodiments, the suspended bubble can be hidden by puncturing the suspended bubble, and the punctured suspended bubble shows a burst special effect similar to a damaged balloon and then disappears.

In some embodiments of the present disclosure, the controlling the virtual entity to move from the original position to the target position and controlling the suspended bubble to follow the virtual entity to move with a delay comprises: in response to the virtual entity moving to the target position, determining a target display position of the suspended bubble when the virtual entity is located at the target position; and controlling the suspended bubble to float from an original display position to the target display position.

In some embodiments, a position where the suspended bubble is located before the virtual entity moves is the original display position, a position where the suspended bubble should be displayed after the virtual entity moves is the target display position, the suspended bubble floats from the original display position to the target display position, and a moving trajectory of the suspended bubble can be a straight line movement from the original display position to the target display position, thereby presenting a drift special effect similar to that of a balloon. If the virtual entity moves again in the process of the movement of the suspended bubble, the suspended bubble does not need to reach the target display position, but may move from a position to which it has currently moved to a position where the suspended bubble should be displayed after the virtual entity moves again.

In some embodiments of the present disclosure, the controlling the suspended bubble to float from the original display position to the target display position comprises: determining a current moving velocity of the suspended bubble at which the suspended bubble moves at a current position thereof, according to the current position, wherein the suspended bubble has an initial velocity of zero at the original display position and has an acceleration, and the greater distance between the suspended bubble and the target display position, the greater acceleration.

In some embodiments, in a stationary state, the suspended bubble has a moving velocity of zero, and after the virtual entity moves, will have an acceleration, the acceleration being proportional to the distance between the current position and the target display position of the suspended bubble, the target display position being the position where the suspended bubble should be after the virtual entity moves, so that the acceleration of the suspended bubble is not fixed and will vary as it moves, and since the suspended bubble has the acceleration, it will start to move and finally move to the target display position. In the present embodiment, the movement mode of the suspended bubble is similar to that of a balloon in a real space, and in order to simulate the movement of the balloon in the real space more realistically, air resistance can also be provided for the process of the movement of the suspended bubble, namely, a reverse acceleration for preventing the movement is provided, and the reverse acceleration is equal to an acceleration generated by the air resistance, so that the real movement of the balloon can be simulated more realistically. In this embodiment, the movement mode of the suspended bubble is similar to a manner in which a balloon suspending in the real world is dragged and then driven, thereby making the display of the suspended bubble in the virtual reality space more realistical, and making the user have more immersive experience.

In some embodiments of the present disclosure, there is further provided a virtual reality-based control apparatus, comprising:

a display configured to display a virtual entity and a suspended bubble associated with the virtual entity in a virtual reality space, the suspended bubble being configured to indicate a function of the virtual entity; and a controller configured to control, in response to a movement event of the virtual entity in the virtual reality space, the suspended bubble to follow the virtual entity to move.

In some embodiments, the virtual entity has one or more components thereon, the suspended bubble being associated with the component; and the displaying the virtual entity and the suspended bubble associated with the virtual entity in the virtual reality space comprises: displaying the virtual entity, the suspended bubble, and a leading line in the virtual reality space, the leading line having one end connected with the suspended bubble and the other end connected with the component associated with the suspended bubble on the virtual entity.

In some embodiments, the displaying the virtual entity, the suspended bubble, and the leading line in the virtual reality space comprises:

determining a first position A where the component associated with the suspended bubble is located;

determining a second position B according to the first position A, wherein the second position B is a position where the suspended bubble is displayed, the second position B having a different horizontal position from the first position A and a greater vertical height than the first position A; and determining the leading line connecting the first position A and the second position B based on a Bezier spline connecting the first position A and the second position B, wherein each of points on the leading line other than the first position and the second position has a greater vertical height than a point at a same horizontal position on the Bezier spline.

In some embodiments, the determining the leading line connecting the first position A and the second position B based on the Bezier spline connecting the first position A and the second position B comprises:

determining a third position C, the third position C having the same vertical position as the first position A and the same horizontal position as the second position B;

determining a first moving point D on a first connection line AC, and determining a second moving point E on a second connection line CB, so that AD/AC<CE/CB;

selecting a third moving point F on a third connection line DE, so that DF/DE=AD/AC; and by making the selected first moving point D move from the first position A to the third position C, finding out all the third moving points F, and connecting all the third moving points F to form the leading line.

In some embodiments, the controlling, in response to the movement event of the virtual entity in the virtual reality space, the suspended bubble to follow the virtual entity to move comprises:

in response to the movement event of the virtual entity in the virtual reality space, controlling the virtual entity to move from an original position to a target position, and controlling the suspended bubble to follow the virtual entity to move with a delay.

In some embodiments, the controlling the virtual entity to move from the original position to the target position and controlling the suspended bubble to follow the virtual entity to move with a delay comprises:

in response to the virtual entity moving to the target location, determining a target display location of the suspended bubble when the virtual entity is located at the target location; and controlling the suspended bubble to float from an original display position to the target display position.

In some embodiments, the controlling the suspended bubble to float from the original display position to the target display position comprises: determining a current moving velocity of the suspended bubble at which the suspended bubble moves at a current position thereof, according to the current position, wherein the suspended bubble has an initial velocity of zero at the original display position and has an acceleration, and the greater distance between the suspended bubble and the target display position, the greater acceleration.

For embodiments of the apparatus, since they substantially correspond to the method embodiments, reference is made to the partial description of the method embodiments for related parts. The above-described apparatus embodiments are merely illustrative, wherein the modules described as separated modules may be or may not be separate. Some or all of the modules may be selected according to actual needs to achieve the purpose of the solution of the embodiment. One of ordinary skill in the art can understand and implement the embodiments without paying out creative efforts.

The method and apparatus of the present disclosure have been described above based on the embodiments and application examples. In addition, the present disclosure further provides a terminal and a storage medium, which will be described below.

Reference is made below to FIG. 5, which shows a schematic structural diagram of an electronic device (for example, a terminal device or server) 800 suitable for implementing the embodiments of the present disclosure. The terminal device in the embodiments of the present disclosure may include, but is not limited to, a mobile terminal such as a mobile phone, a notebook computer, a digital broadcast receiver, a PDA (Personal Digital Assistant), a PAD (Tablet Computer), a PMP (Portable Multimedia Player), a vehicle-mounted terminal (for example, a vehicle-mounted navigation terminal) and the like, and a fixed terminal such as a digital TV, a desktop computer and the like. The electronic device shown in the figure is only an example and should not bring any limitation to the functions and the scope of use of the embodiments of the present disclosure.

As shown in FIG. 5, the electronic device 800 may comprise a processing means (for example, a central processing unit, a graphics processing unit, etc.) 801 that may perform various appropriate actions and processes according to a program stored in a read-only memory (ROM) 802 or a program loaded from a storage means 808 into a random access memory (RAM) 803. In the RAM 803, various programs and data necessary for the operation of the electronic device 800 are also stored. The processing means 801, the ROM 802, and the RAM 803 are connected to each other via a bus 804. An input/output (I/O) interface 805 is also connected to the bus 804.

Generally, the following means may be connected to the I/O interface 805: an input means 806 including, for example, a touch screen, touch pad, keyboard, mouse, camera, microphone, accelerometer, gyroscope, etc.; an output means 807 including, for example, a liquid crystal display (LCD), speaker, vibrator, etc.; the storage means 808 including, for example, a magnetic tape, hard disk, etc.; and a communication means 809. The communication means 809 may allow the electronic device 800 to communicate wirelessly or by wire with other devices to exchange data. While the electronic device 800 having the various means is shown in the figure, it should be understood that not all illustrated means are required to be implemented or provided. More or fewer means may be alternatively implemented or provided.

In particular, according to the embodiments of the present disclosure, the processes described above with reference to the flow diagrams may be implemented as a computer software program. For example, the embodiments of the present disclosure comprise a computer program product which comprises a computer program carried on a computer-readable medium, the computer program containing program code for performing the method illustrated by the flow diagrams. In such an embodiment, the computer program may be downloaded from a network via the communications means 809 and installed, or installed from the storage means 808, or installed from the ROM 802. The computer program, when executed by the processing means 801, performs the above functions defined in the method of the embodiments of the present disclosure.

It should be noted that the above computer-readable medium of the present disclosure may be a computer-readable signal medium or a computer-readable storage medium or any combination of the above two. The computer-readable storage medium may be, for example, but is not limited to, an electronic, magnetic, optical, electromagnetic, infrared, or semiconductor system, apparatus, or device, or any combination of the foregoing. More specific examples of the computer-readable storage medium may comprise, but are not limited to: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, the computer-readable storage medium may be any tangible medium that contains or stores a program which can be used by or in conjunction with an instruction execution system, apparatus, or device. Meanwhile, in the present disclosure, the computer-readable signal medium may comprise a data signal propagated in baseband or as part of a carrier wave, in which computer-readable program code is carried. Such a propagated data signal may take a variety of forms, including, but not limited to, an electromagnetic signal, optical signal, or any suitable combination of the forgoing. The computer-readable signal medium may also be any computer-readable medium other than the computer-readable storage medium, wherein the computer-readable signal medium can send, propagate, or transmit a program for use by or in conjunction with an instruction execution system, apparatus, or device. The program code contained on the computer-readable medium may be transmitted using any appropriate medium, including but not limited to: a wire, an optical cable, RF (Radio Frequency), etc., or any suitable combination of the foregoing.

In some embodiments, a client and a server may communicate using any currently known or future developed network protocol, such as HTTP (HyperText Transfer Protocol), and may be interconnected with any form or medium of digital data communication (e.g., a communication network). Examples of the communication network include a local area network ("LAN"), a wide area network ("WAN"), an internet (e.g., the Internet), and a peer-to-peer network (e.g., an ad hoc peer-to-peer network), as well as any currently known or future developed network.

The above computer-readable medium may be embodied in the above electronic device; or may be exist separately without being assembled into the electronic device.

The above computer-readable medium has one or more programs carried thereon, wherein the above one or more programs, when executed by the electronic device, cause the electronic device to perform the method of the present disclosure as described above.

The computer program code for performing the operations of the present disclosure may be written in one or more programming languages or a combination thereof, wherein the above programming language includes an object-oriented programming language such as Java, Smalltalk, C++, and includes a conventional procedural programming language, such as the "C" language or similar programming languages. The program code may be executed entirely on a user's computer, partly on the user's computer, as a stand-alone software package, partly on the user's computer and partly on a remote computer, or entirely on the remote computer or server. In a scenario where the remote computer is involved, the remote computer may be connected to the user's computer through any type of network, including a local area network (LAN) or a wide area network (WAN), or may be connected to an external computer (for example, through the Internet using an Internet service provider).

The flow diagrams and block diagrams in the drawings illustrate the possibly implemented architecture, functions, and operations of the system, method and computer program product according to various embodiments of the present disclosure. In this regard, each block in the flow diagrams or block diagrams may represent a module, program segment, or portion of code, which comprises one or more executable instructions for implementing a specified logical function. It should also be noted that, in some alternative implementations, functions noted in blocks may occur in an order different from that noted in the drawings. For example, two blocks shown in succession may, in fact, be executed substantially concurrently, or they may sometimes be executed in a reverse order, which depends upon the functions involved. It will also be noted that each block in the block diagrams and/or flow diagrams, and a combination of blocks in the block diagrams and/or flow diagrams, can be implemented by a special-purpose hardware-based system that performs specified functions or operations, or by a combination of special-purpose hardware and computer instructions.

The involved unit described in the embodiments of the present disclosure may be implemented by software or hardware. The name of the unit does not, in some cases, constitute a limitation on the unit itself.

The functions described above herein may be executed, at least partially, by one or more hardware logic components. For example, without limitation, exemplary types of the hardware logic component that may be used include: a field programmable gate array (FPGA), application specific integrated circuit (ASIC), application specific standard product (ASSP), system on chip (SOC), complex programmable logic device (CPLD), and the like.

In the context of this disclosure, a machine-readable medium may be a tangible medium, which can contain or store a program for use by or in conjunction with an instruction execution system, apparatus, or device. The machine-readable medium may be a machine-readable signal medium or a machine-readable storage medium. The machine-readable medium may comprise, but is not limited to, an electronic, magnetic, optical, electromagnetic, infrared, or semiconductor system, apparatus, or device, or any suitable combination of the foregoing. More specific examples of the machine-readable storage medium may include an electrical connection based on one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

According to one or more embodiments of the present disclosure, there is provided a virtual reality-based control method comprising:

displaying a virtual entity and a suspended bubble associated with the virtual entity in a virtual reality space, the suspended bubble being configured to indicate a function of the virtual entity; and controlling, in response to a movement event of the virtual entity in the virtual reality space, the suspended bubble to follow the virtual entity to move.

According to one or more embodiments of the present disclosure, there is provided a virtual reality-based control method, wherein the virtual entity has one or more components thereon, the suspended bubble being associated with the component; and the displaying the virtual entity and the suspended bubble associated with the virtual entity in the virtual reality space comprises: displaying the virtual entity, the suspended bubble, and a leading line in the virtual reality space, the leading line having one end connected with the suspended bubble and the other end connected with the component associated with the suspended bubble on the virtual entity.

According to one or more embodiments of the present disclosure, there is provided a virtual reality-based control method, wherein the displaying the virtual entity, the suspended bubble, and the leading line in the virtual reality space comprises:

determining a first position A where the component associated with the suspended bubble is located;

determining a second position B according to the first position A, wherein the second position B is a position where the suspended bubble is displayed, the second position B having a different horizontal position from the first position A and a greater vertical height than the first position A; and determining the leading line connecting the first position A and the second position B based on a Bezier spline connecting the first position A and the second position B, wherein each of points on the leading line other than the first position and the second position has a greater vertical height than a point at a same horizontal position on the Bezier spline.

According to one or more embodiments of the present disclosure, there is provided a virtual reality-based control method, wherein the determining the leading line connecting the first position A and the second position B based on the Bezier spline connecting the first position A and the second position B comprises:

determining a third position C, the third position C having the same vertical position as the first position A and the same horizontal position as the second position B;

determining a first moving point D on a first connection line AC, and determining a second moving point E on a second connection line CB, so that AD/AC<CE/CB;

selecting a third moving point F on a third connection line DE, so that DF/DE=AD/AC; and by making the selected first moving point D move from the first position A to the third position C, finding out all the third moving points F, and connecting all the third moving points F to form the leading line.

According to one or more embodiments of the present disclosure, there is provided a virtual reality-based control method, wherein the controlling, in response to the movement event of the virtual entity in the virtual reality space, the suspended bubble to follow the virtual entity to move comprises:

in response to the movement event of the virtual entity in the virtual reality space, controlling the virtual entity to move from an original position to a target position, and controlling the suspended bubble to follow the virtual entity to move with a delay.

According to one or more embodiments of the present disclosure, there is provided a virtual reality-based control method, wherein the controlling the virtual entity to move from the original position to the target position and controlling the suspended bubble to follow the virtual entity to move with a delay comprises:

in response to the virtual entity moving to the target location, determining a target display location of the suspended bubble when the virtual entity is located at the target location; and controlling the suspended bubble to float from an original display position to the target display position.

According to one or more embodiments of the present disclosure, there is provided a virtual reality-based control method, wherein the controlling the suspended bubble to float from the original display position to the target display position comprises:

determining a current moving velocity of the suspended bubble at which the suspended bubble moves at a current position thereof, according to the current position, wherein the suspended bubble has an initial velocity of zero at the original display position and has an acceleration, and the greater distance between the suspended bubble and the target display position, the greater acceleration.

According to one or more embodiments of the present disclosure, there is provided a virtual reality-based control apparatus, characterized by comprising:

a display configured to display a virtual entity and a suspended bubble associated with the virtual entity in a virtual reality space, the suspended bubble being configured to indicate a function of the virtual entity; and a controller configured to control, in response to a movement event of the virtual entity in the virtual reality space, the suspended bubble to follow the virtual entity to move.

According to one or more embodiments of the present disclosure, there is provided a terminal, comprising: at least one memory and at least one processor, wherein the at least one memory is configured to store program code and the at least one processor is configured to call the program code stored in the at least one memory to perform the method according to any of the above.

According to one or more embodiments of the present disclosure, there is provided a non-transitory computer-readable storage medium for storing program code which, when run by a computer, causes the computer to perform the method according to any of the above.

The foregoing description is only the preferred embodiments of the present disclosure and an explanation of the technical principles employed. It should be appreciated by those skilled in the art that the disclosed scope involved in the present disclosure is not limited to the technical solutions formed by specific combinations of the technical features described above, but also encompasses other technical solutions formed by arbitrary combinations of the above technical features or equivalent features thereof without departing from the above disclosed concepts, for example, a technical solution formed by performing mutual replacement between the above features and technical features having similar functions disclosed (but not limited to) in the present disclosure.

Furthermore, while operations are depicted in a specific order, this should not be understood as requiring that these operations be performed in the specific order shown or in a sequential order. Under certain circumstances, multitasking and parallel processing might be advantageous. Similarly, while several specific implementation details are included in the above discussion, these should not be construed as limitations on the scope of the present disclosure. Certain features that are described in the context of separate embodiments may also be implemented in combination in a single embodiment. Conversely, various features that are described in the context of a single embodiment may also be implemented in multiple embodiments separately or in any suitable sub-combination.

Although the subject matter has been described in language specific to structural features and/or method logical actions, it should be understood that the subject matter defined in the attached claims is not necessarily limited to the specific features or actions described above. Rather, the specific features and actions described above are only example forms of implementing the claims.

What is claimed is:

1. A virtual reality-based control method, comprising:

displaying a virtual entity and a suspended bubble associated with the virtual entity in a virtual reality space, the suspended bubble being configured to indicate a function of the virtual entity; and controlling, in response to a movement event of the virtual entity in the virtual reality space, the virtual entity to move from an original position to a target position, and controlling the suspended bubble to follow the virtual entity to move with a delay, wherein the controlling the virtual entity to move from the original position to the target position and controlling the suspended bubble to follow the virtual entity to move with a delay comprises:

in response to the virtual entity moving to the target position, determining a target display position of the suspended bubble when the virtual entity is located at the target position; and controlling the suspended bubble to float from an original display position to the target display position; and wherein the controlling the suspended bubble to float from the original display position to the target display position comprises:

determining a current moving velocity of the suspended bubble at which the suspended bubble moves at a current position thereof, according to the current position.

2. The method according to claim 1, wherein, the virtual entity has one or more components thereon, the suspended bubble being associated with a component of the one or more components; and the displaying the virtual entity and the suspended bubble associated with the virtual entity in the virtual reality space comprises: displaying the virtual entity, the suspended bubble, and a leading line in the virtual reality space, the leading line having one end connected with the suspended bubble and the other end connected with the component associated with the suspended bubble on the virtual entity.

3. The method according to claim 2, wherein, the displaying the virtual entity, the suspended bubble, and the leading line in the virtual reality space comprises:

determining a first position A where the component associated with the suspended bubble is located;

determining a second position B according to the first position A, wherein the second position B is a position where the suspended bubble is displayed, the second position B having a different horizontal position from the first position A and a greater vertical height than the first position A; and determining the leading line connecting the first position A and the second position B based on a Bezier spline connecting the first position A and the second position B, wherein each of points on the leading line other than the first position and the second position has a greater vertical height than a point at a same horizontal position on the Bezier spline.

4. The method according to claim 3, wherein, the determining the leading line connecting the first position A and the second position B based on the Bezier spline connecting the first position A and the second position B comprises:

determining a third position C, the third position C having the same vertical position as the first position A and the same horizontal position as the second position B;

determining a first moving point D on a first connection line AC, and determining a second moving point E on a second connection line CB, so that AD/AC<CE/CB;

selecting a third moving point F on a third connection line DE, so that DF/DE=AD/AC; and by making the selected first moving point D move from the first position A to the third position C, finding out all the third moving points F, and connecting all the third moving points F to form the leading line.

5. The method according to claim 1, wherein the suspended bubble has an initial velocity of zero at the original display position and has an acceleration, and the greater distance between the suspended bubble and the target display position, the greater acceleration.

6. A non-transitory computer-readable storage medium for storing program code which, when run by a computer, causes the computer to perform the method according to claim 1.

7. A virtual reality-based control apparatus, comprising:

a display configured to display a virtual entity and a suspended bubble associated with the virtual entity in a virtual reality space, the suspended bubble being configured to indicate a function of the virtual entity; and a controller configured to control, in response to a movement event of the virtual entity in the virtual reality space, the virtual entity to move from an original position to a target position, and control the suspended bubble to follow the virtual entity to move with a delay, wherein the controller is further configured to determine, in response to the virtual entity moving to the target position, a target display position of the suspended bubble when the virtual entity is located at the target position; and control the suspended bubble to float from an original display position to the target display position; and the controller is further configured to determine a current moving velocity of the suspended bubble at which the suspended bubble moves at a current position thereof, according to the current position.

8. A terminal, comprising:

at least one memory and at least one processor, wherein the at least one memory is configured to store program code and the at least one processor is configured to call the program code stored in the at least one memory to display a virtual entity and a suspended bubble associated with the virtual entity in a virtual reality space, the suspended bubble being configured to indicate a function of the virtual entity; and control, in response to a movement event of the virtual entity in the virtual reality space, the virtual entity to move from an original position to a target position, and control the suspended bubble to follow the virtual entity to move with a delay, wherein the controlling the virtual entity to move from the original position to the target position and controlling the suspended bubble to follow the virtual entity to move with a delay comprises:

in response to the virtual entity moving to the target position, determining a target display position of the suspended bubble when the virtual entity is located at the target position; and controlling the suspended bubble to float from an original display position to the target display position; and wherein the controlling the suspended bubble to float from the original display position to the target display position comprises:

determining a current moving velocity of the suspended bubble at which the suspended bubble moves at a current position thereof, according to the current position.

9. The terminal according to claim 8, wherein, the virtual entity has one or more components thereon, the suspended bubble being associated with a component of the one or more components; and the displaying the virtual entity and the suspended bubble associated with the virtual entity in the virtual reality space comprises: displaying the virtual entity, the suspended bubble, and a leading line in the virtual reality space, the leading line having one end connected with the suspended bubble and the other end connected with the component associated with the suspended bubble on the virtual entity.

10. The terminal according to claim 9, wherein, the displaying the virtual entity, the suspended bubble, and the leading line in the virtual reality space comprises:

determining a first position A where the component associated with the suspended bubble is located;

determining a second position B according to the first position A, wherein the second position B is a position where the suspended bubble is displayed, the second position B having a different horizontal position from the first position A and a greater vertical height than the first position A; and determining the leading line connecting the first position A and the second position B based on a Bezier spline connecting the first position A and the second position B, wherein each of points on the leading line other than the first position and the second position has a greater vertical height than a point at a same horizontal position on the Bezier spline.

11. The terminal according to claim 10, wherein, the determining the leading line connecting the first position A and the second position B based on the Bezier spline connecting the first position A and the second position B comprises:

determining a third position C, the third position C having the same vertical position as the first position A and the same horizontal position as the second position B;

determining a first moving point D on a first connection line AC, and determining a second moving point E on a second connection line CB, so that AD/AC<CE/CB;

selecting a third moving point F on a third connection line DE, so that DF/DE=AD/AC; and by making the selected first moving point D move from the first position A to the third position C, finding out all the third moving points F, and connecting all the third moving points F to form the leading line.

12. The terminal according to claim 8, wherein the suspended bubble has an initial velocity of zero at the original display position and has an acceleration, and the greater distance between the suspended bubble and the target display position, the greater acceleration.

* * * * *